United States Patent
Mutlu et al.

(10) Patent No.: US 9,588,810 B2
(45) Date of Patent: Mar. 7, 2017

(54) PARALLELISM-AWARE MEMORY REQUEST SCHEDULING IN SHARED MEMORY CONTROLLERS

(75) Inventors: Onur Mutlu, Kirkland, WA (US); Thomas Moscibroda, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 2338 days.

(21) Appl. No.: 11/835,435

(22) Filed: Aug. 8, 2007

(65) Prior Publication Data
US 2009/0044189 A1    Feb. 12, 2009

(51) Int. Cl.
*G06F 9/46*    (2006.01)
*G06F 9/48*    (2006.01)

(52) U.S. Cl.
CPC ...... *G06F 9/4881* (2013.01); *G06F 2209/485* (2013.01)

(58) Field of Classification Search
None
See application file for complete search history.

(56) References Cited

U.S. PATENT DOCUMENTS

| | | | |
|---|---|---|---|
| 5,664,092 A * | 9/1997 | Waites | 714/25 |
| 6,185,221 B1 * | 2/2001 | Aybay | 370/412 |
| 6,243,788 B1 | 6/2001 | Franke et al. | |
| 6,249,288 B1 * | 6/2001 | Campbell | 345/629 |
| 6,345,313 B1 * | 2/2002 | Lindholm | G06F 9/5016 718/100 |
| 6,360,303 B1 * | 3/2002 | Wisler | G06F 9/526 711/147 |

(Continued)

FOREIGN PATENT DOCUMENTS

WO    WO2006117746 A1    11/2006

OTHER PUBLICATIONS

Nesbit_2006.pdf "Fair Queuing Memory Systems", Proceedings of the 39th Annual IEEE/ACM International Symposium on Microarchitecture, 2006, pp. 12.*

(Continued)

*Primary Examiner* — Hiren Patel
(74) *Attorney, Agent, or Firm* — Alin Corie; Sandy Swain; Micky Minhas

(57) ABSTRACT

Parallelism-aware scheduling of memory requests of threads in shared memory controllers. Parallel scheduling is achieved by prioritizing threads that already have requests being serviced in the memory banks. A first algorithm prioritizes requests of the last-scheduled thread that is currently being serviced. This is accomplished by tracking the thread that generated the last-scheduled request (if the request is still being serviced), and then scheduling another request from the same thread if there is an outstanding ready request from the same thread. A second algorithm prioritizes the requests of all threads that are currently being serviced. This is accomplished by tracking threads that have at least one request currently being serviced in the banks, and assigning the highest priority to these threads in the scheduling decisions. If there are no outstanding requests from any thread having requests that are being serviced, the algorithm defaults back to a baseline scheduling algorithm.

7 Claims, 15 Drawing Sheets

(56) References Cited

U.S. PATENT DOCUMENTS

| | | | |
|---|---|---|---|
| 6,549,930 B1 | 4/2003 | Chrysos et al. | |
| 6,785,793 B2 | 8/2004 | Aboulenein et al. | |
| 6,961,834 B2 | 11/2005 | Weber | |
| 7,111,153 B2 | 9/2006 | Kuttanna et al. | |
| 8,037,476 B1* | 10/2011 | Shavit et al. | 718/104 |
| 2001/0039575 A1* | 11/2001 | Freund et al. | 709/223 |
| 2003/0074519 A1* | 4/2003 | Weber | 711/105 |
| 2003/0074520 A1* | 4/2003 | Weber | 711/105 |
| 2003/0131204 A1* | 7/2003 | Lin et al. | 711/152 |
| 2004/0156362 A1* | 8/2004 | Pathi et al. | 370/389 |
| 2004/0160954 A1* | 8/2004 | Shimizu et al. | 370/389 |
| 2004/0210899 A1* | 10/2004 | Somogyi | 718/100 |
| 2005/0022196 A1* | 1/2005 | Davis et al. | 718/100 |
| 2005/0071576 A1 | 3/2005 | Giernalczyk et al. | |
| 2005/0076335 A1* | 4/2005 | Cavage et al. | 718/100 |
| 2005/0138628 A1 | 6/2005 | Bradford et al. | |
| 2005/0240745 A1 | 10/2005 | Iyer et al. | |
| 2006/0123169 A1 | 6/2006 | Chai et al. | |
| 2006/0136915 A1* | 6/2006 | Aingaran et al. | 718/100 |
| 2006/0184737 A1 | 8/2006 | Yamada | |
| 2007/0005877 A1 | 1/2007 | Tetrick | |
| 2007/0043531 A1 | 2/2007 | Kosche et al. | |
| 2007/0124446 A1* | 5/2007 | Coulthard et al. | 709/223 |
| 2007/0198782 A1* | 8/2007 | Sved et al. | 711/154 |
| 2007/0282838 A1* | 12/2007 | Shavit | G06F 9/3004 |
| 2009/0031314 A1* | 1/2009 | Moscibroda | G06F 9/52 718/102 |
| 2011/0023033 A1* | 1/2011 | Memik et al. | 718/100 |

OTHER PUBLICATIONS

Zhu_2005.pdf, "A Performance Comparison of DRAM Memory System Optimizations for SMT Processors", Proceedings of the 11th International Symposium on High-Performance Computer Architecture, 2005, pp. 12.*

Moscibroda, et al., "Memory Performance Attacks: Denial of Memory Service in Multi-Core Systems", Microsoft Research, Technical Report—MSR-TR-2007-15, Feb. 2007, 21 pages.

International Search Report and Written Opinion Received for PCT Application No. PCT/US2008/072230, mailed on Feb. 27, 2009, 11 pages.

Rixner, et al., "Memory Access Scheduling", Proceedings of the 27th International Symposium on Computer Architecture, 2000, pp. 1-11.

Mathew, et al., "Design of a Parallel Vector Access Unit of SDRAM Memory Systems", Proceedings of the Sixth International Symposium on High Performance Computer Architecture, Jan. 2000, pp. 10.

Zhu, et al., "Fine-grain Priority Scheduling on Multi-channel Memory Systems", Proceedings of the 8th International Symposium on High Performance Computer Architecture, Feb. 2-6, 2002, pp. 10.

Rixner, "Memory Controller Optimizations for Web Servers", Proceedings of the 37th International Symposium on Microarchitecture (MICRO-37), Dec. 2004, pp. 12.

Nesbit, et al., "Fair Queuing Memory Systems", Proceedings of the 39th Annual IEEE/ACM International Symposium on Microarchitecture, 2006, pp. 12.

Tomasulo, "An Efficient Algorithm for Exploiting Multiple Arithmetic Units", IBM Journal of Research and Development, vol. 11, No. 1, Jan. 1967, pp. 25-33.

Callahan, et al., "Software Prefetching", Proceedings of the Fourth International Conference on Architectural Support for Programming Languages and Operating Systems, ACM, 1991, pp. 40-52.

Mutlu, et al., "Runahead Execution: An Alternative to Very Large Instruction Windows for Out-of-order Processors", 9th International Symposium on High-Performance Computer Architecture (HPCA), Feb. 2003, pp. 12.

Mowry, et al., "Design and Evaluation of a Compiler Algorithm for Prefetching", Proceedings of the Fifth International Conference on Architectural Support for Programming Languages and Operating Systems (ASPLOS-V), Oct. 1992, pp. 62-73.

* cited by examiner

| | ADDRESS | ROW# | THREAD-ID | REQUEST-ID |
|---|---|---|---|---|
| ENTRY B | | | | |
| | | | | |
| | | | | |
| | | | | |
| ENTRY 1 | | | | |
| ENTRY 0 | | | | |

*FIG. 9*

PARALLELISM-AWARE MEMORY REQUEST SCHEDULING IN SHARED MEMORY CONTROLLERS

BACKGROUND

Many conventional processors can simultaneously execute more than one thread on the same chip (e.g., chip-multiprocessors or multi-core processors, symmetric shared-memory multiprocessors, simultaneous multithreading processors). In these systems, the memory system (e.g., DRAM) is shared among the threads concurrently executing on different processing cores or different execution contexts. The memory controller receives requests from different threads and attempts to schedule the requests. Current memory controllers try to schedule requests such that the data throughput obtained from the memory is maximized. However, blindly maximizing the data throughput obtained from the memory system ignores the latency experienced by each individual thread by ignoring the parallelism of requests generated by each thread.

When a thread is executed in a conventional processor, the thread can generate multiple concurrent memory requests due to techniques such as out-of-order instruction execution, data prefetching, or run-ahead execution. If these requests are to different banks in the memory system, the requests can be serviced in parallel. If the concurrent memory requests from a thread are serviced in parallel, the associated memory access latencies are overlapped and the processor is stalled only as if it were waiting for a single memory access (to a first approximation). For example, if access to a memory bank takes M cycles, five concurrent accesses to different memory banks can take M cycles (or not significantly more), since different memory banks can be accessed concurrently. In contrast, if the processor generates the five memory requests serially (one request only after the previous request was complete) or all requests go to the same bank, then no parallelism is possible and the processor needs to wait for 5*M cycles until all requests are serviced.

Accordingly, the latter technique for generating memory requests significantly reduces performance since it takes the processor longer to do the same amount of work. For this reason, conventional processors employ sophisticated techniques as mentioned above (e.g., out-of-order execution, run-ahead execution, and prefetching) to generate memory requests concurrently.

If a thread that generates concurrent requests is the only thread running in the system, existing memory controllers can schedule those requests efficiently in parallel. Unfortunately, if multiple threads are generating memory requests concurrently (e.g., in a multi-core processor system), the memory controller can schedule the outstanding requests according to one mainstream scheduling technique called FR-FCFS (which schedules requests on a first-ready first-come-first-serve basis). FR-FCFS completely ignores the fact that servicing the outstanding memory requests from a thread in parallel can result in much smaller stall-time at the application layer than servicing the requests serially (one after another). Hence, a thread having requests that interfere with other thread requests can be significantly delayed in the memory system because the associated memory accesses could be scheduled serially by the memory controller. However, the associated memory accesses would be serviced in parallel had the thread been executed by itself or had the memory controller been aware of the parallelism among a thread's requests.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Disclosed is a novel mechanism for scheduling memory-requests in shared memory controllers (e.g., DRAM). The described memory scheduler exploits the parallelism inherent to different threads and can therefore substantially reduce the stall-times of applications in multi-core systems and other computer systems with concurrently executing threads.

Parallelism-aware scheduling is achieved by prioritizing threads that already have requests that are being serviced in the memory banks. If there are no outstanding requests from any thread having requests that are being serviced, the algorithm defaults back to a baseline scheduling algorithm.

A first algorithm prioritizes requests of the last-scheduled thread that is currently being serviced in the memory banks. This is accomplished by tracking the thread that generated the last-scheduled request (if the request is still being serviced), and then scheduling another request from the same thread if there is an outstanding ready request from the same thread.

A second algorithm prioritizes the requests of all threads that are currently being serviced in the memory banks. This is accomplished by tracking threads that have at least one request currently being serviced in the banks, and assigning the highest priority to these threads in the scheduling decisions.

A determining aspect is that by prioritizing the requests of a thread (or the threads) that already have an in-progress request in the memory banks, the parallelism among the requests of that thread (or requests of those threads) can be increased and the bank access latencies of the different accesses from the same thread overlap. By overlapping the access latencies of different requests from the same thread, the scheduler reduces the stall time experienced by that thread because the thread will stall once for all of the overlapped requests, rather than stalling once for each request had the requests been serviced serially.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

FIG. 9 illustrates one exemplary implementation of a bank request buffer for parallelism-aware scheduling in accordance with the disclosed architecture.

DETAILED DESCRIPTION

Figure 1:
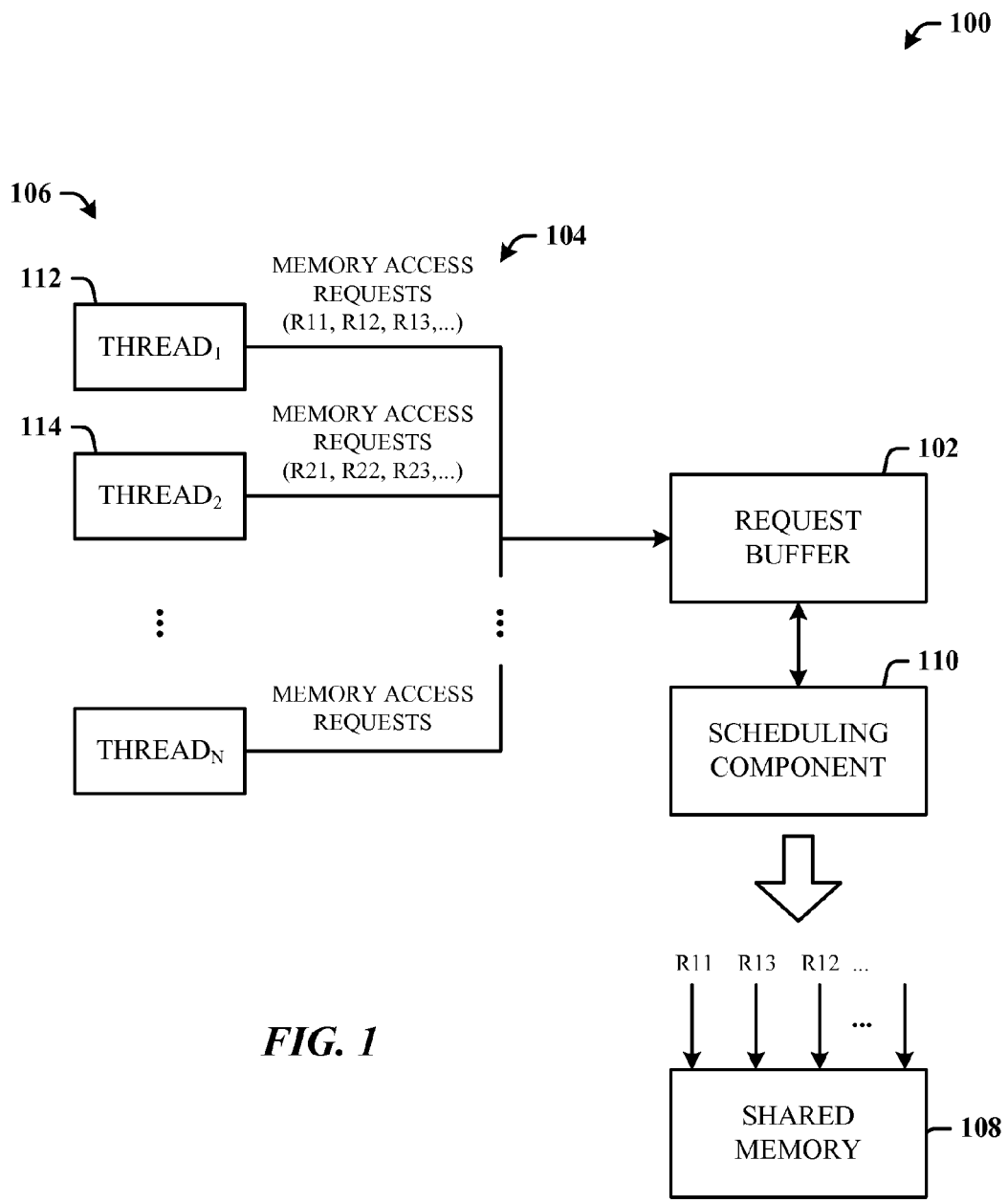
FIG. 1 illustrates a computer-implemented memory management system for parallelism-aware request scheduling.

Ignoring parallelism in the memory requests generated by a thread results in suboptimal performance such as increased stall-times of the processors. A novel mechanism is disclosed for scheduling memory requests in shared memory controllers. The memory scheduler exploits the parallelism inherent to different threads and thereby substantially reduces the stall-times of applications in multi-core systems and other single-core computer systems with concurrently executing threads.

A "core" as used herein is defined to include the instruction processing pipelines (integer and floating-point), instruction execution units, and the L1 instruction and data caches. Many general-purpose computers manufactured today look like a dual-core system in that there exist two separate, but identical, cores. In some systems each core has its own private L2 cache, while in other systems the L2 cache is shared between different cores. Regardless of whether or not the L2 cache is shared, the memory system of current multi-core systems is shared among all cores. Hence, different threads executing on different cores can interfere with each other in the memory system.

Following is a brief background description of DRAM memory system operation and terms that will be used throughout this description. Although described in the context of a DRAM memory system, the disclosed novel parallelism architecture applies to other memory systems, as well.

A DRAM memory system consists of three major components: (1) the DRAM banks that store the actual data, (2) the DRAM controller (scheduler) that schedules commands to read/write data from/to the DRAM banks, and (3) DRAM address/data/command buses that connect the DRAM banks and the DRAM controller.

A DRAM memory system is organized into multiple banks such that memory requests to different banks can be serviced in parallel. Each DRAM bank has a two-dimensional structure that consists of multiple rows and columns. Consecutive addresses in memory are located in consecutive columns in the same row. Each bank has one row-buffer, and data can only be read from this buffer. The row-buffer contains at most a single row at any given time. Due to the existence of the row-buffer, modern DRAMs are not truly random access (equal access time to all locations in the memory array). Instead, depending on the access pattern to a bank, a DRAM access can fall into one of the three following categories:

1. Row hit: The access is to the row that is already in the row-buffer. The requested column can simply be read from or written into the row-buffer (called a column access). This case results in the lowest latency (typically 40-50 nanoseconds in commodity memory, including data transfer time, which translates into 120-150 processor cycles for a core running at 3 GHz clock frequency).

2. Row conflict: The access is to a row different from the one that is currently in the row-buffer. In this case, the row in the row-buffer first needs to be written back into the memory array (called a row-close) because the row access had destroyed the row's data in the memory array. Then, a row access is performed to load the requested row into the row-buffer. Finally, a column access is performed. Note that this case has much higher latency than a row hit (typically 80-100 nanoseconds or 240-300 processor cycles at 3 GHz).

3. Row closed: There is no row in the row-buffer. Due to various reasons (e.g., to save energy), DRAM memory controllers sometimes close an open row in the row-buffer, leaving the row-buffer empty. In this case, the required row needs to be first loaded into the row-buffer (called a row access). Then, a column access is performed. This third case is mentioned for sake of completeness; however, the focus herein is primarily on row hits and row conflicts, which have the greatest impact.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof.

Referring initially to the drawings, FIG. 1 illustrates a computer-implemented memory management system 100 for parallelism-aware request scheduling. The system 100 includes a request buffer 102 for receiving memory access requests 104 from multiple threads 106 (denoted $THREAD_1$, $THREAD_2$, ..., $THREAD_N$) to shared memory 108. A scheduling component 110 schedules requests of a thread in parallel. In other words, other requests (R11, R12, R13, ... ) of a first thread 112 in the request buffer 102 will be prioritized over other thread requests in the buffer 102 for access to the shared memory 108 in a parallel manner if the first thread 112 already has one or more requests being serviced (also referred to as in-progress) to the memory 108.

Similarly, if a second thread 114 has one or more requests (R21, R22, R23, ... ) currently in-progress, the scheduling component 110 will know this and prioritize other requests in the request buffer 102 for the second thread, for shared memory access in a parallel manner. Thus, the scheduling component uses new heuristics to increase parallelism in request processing, thereby reducing the experienced memory-related stall-time of threads.

A goal is to take as many requests as possible from one thread, finish the requests quickly to free up that thread, and then move on to another thread. This applies to across-bank scheduling, as well as within-bank scheduling, both of which will be described in detail herein.

The system 100 tracks memory state of what requests are currently executing. Consider an example in terms of eight memory banks where each bank is executing one request. When the eighth bank is free, seven requests are still being executed, and a new request can be selected for the eighth bank. The new request is then selected based on the requests that are currently being serviced in the other seven banks. This is accomplished by prioritizing requests from threads that already have requests that are being serviced. For example, if thread A has already has five requests being serviced in the now seven banks (the eighth bank is free), thread A already exhibits significant parallelism in request scheduling. Thus, an additional scheduled request for thread A can now be prioritized over requests of other threads for use in the eighth bank.

At least two algorithms are described, one of which tries to prioritize requests from the thread that was previously scheduled. Thus, if the last scheduled request was from thread A, in the next cycle, the scheduler tries to prioritize more of thread A's requests over other threads' requests. The first algorithm tries to put the request of thread A, of the last scheduled thread, to be serviced in the memory banks at the same time. The second algorithm performs this for multiple threads that have outstanding requests in the bank. If either of the above algorithms is not activated for parallelism in scheduling, then scheduling is performed according to a baseline algorithm. In one implementation, only one of the two new algorithms is employed in conjunction with the baseline algorithm. In an alternative design, both algorithms are available in the system, but only one is selected for scheduling in combination with the baseline algorithm.

The baseline algorithm can be any suitable conventional scheduling algorithm such as First-Ready First-Come-First-Serve (FR-FCFS) or First-Come-First-Serve (FCFS), for example. The FR-FCFS algorithm is employed as the baseline algorithm in this description and is described in greater detail below.

Current memory access schedulers usually employ the FR-FCFS algorithm to select which request should be scheduled next. The FR-FCFS algorithm prioritizes requests in the following order in a bank:

1. Row-hit-first: a bank scheduler gives higher priority to the requests that would be serviced faster. In other words, a request that would result in a row hit is prioritized over a request that would cause a row conflict.

2. Oldest-within-bank-first: a bank scheduler gives higher priority to the request that arrived earliest.

Selection from the requests chosen by the bank schedulers is done as follows: oldest-across-banks-first—the across-bank bus scheduler selects the request with the earliest arrival time among all the requests selected by individual bank schedulers.

In summary, the FR-FCFS algorithm strives to maximize memory throughput (the number of serviced requests per time interval) by scheduling accesses that cause row hits first (regardless of when these requests have arrived) within a bank. Hence, streaming memory access patterns are prioritized within the memory system. The oldest row-hit request has the highest priority in the memory access scheduler. In contrast, the youngest row-conflict request has the lowest priority. (Note that although described in the context of FR-FCFS, it is to be understood that other conventional scheduling algorithms can be employed as the baseline algorithm.)

Figure 2:
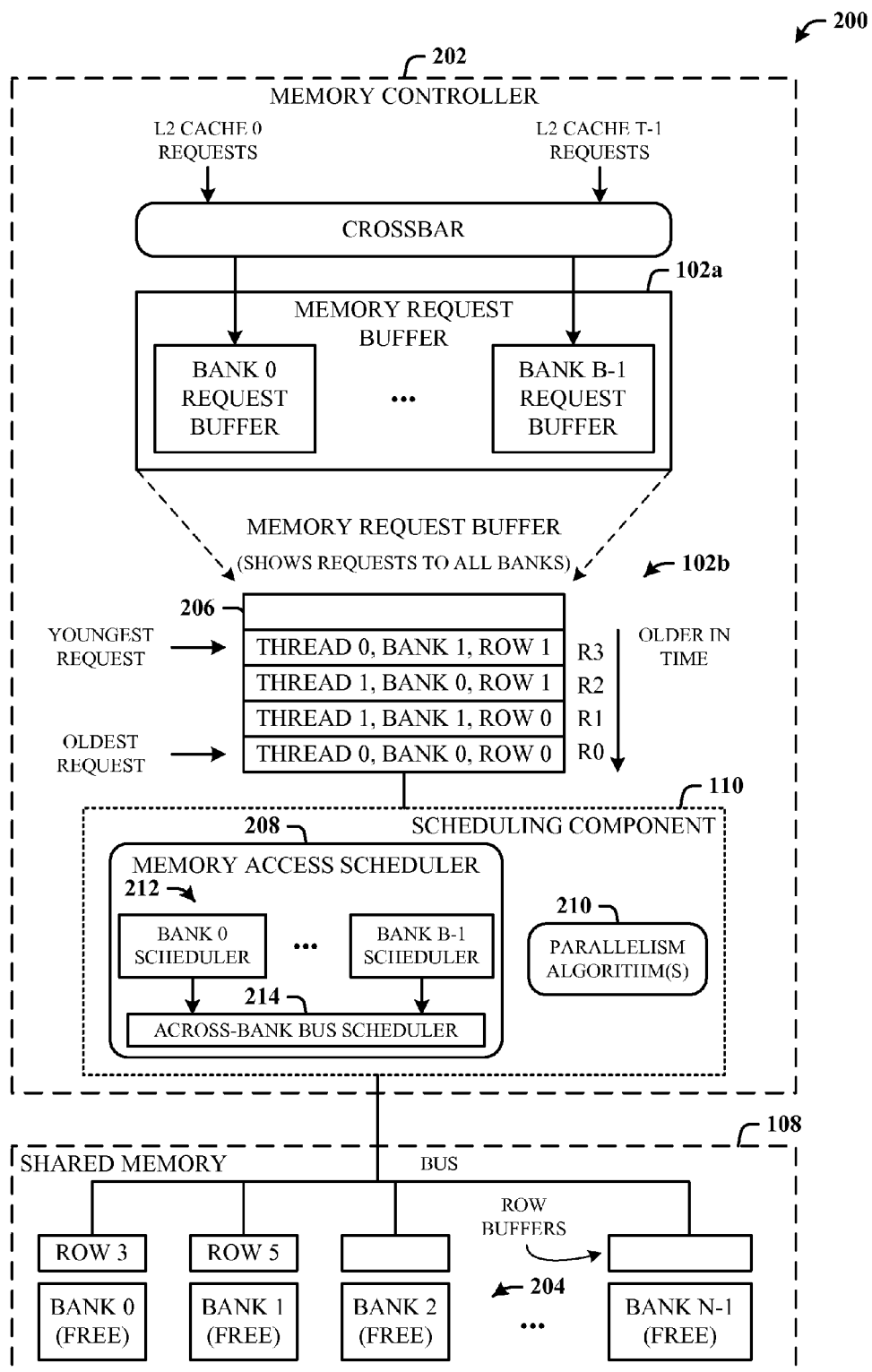
FIG. 2 illustrates an exemplary controller and memory system for parallelism-aware request scheduling in a shared memory implementation.

FIG. 2 illustrates an exemplary controller and memory system 200 for parallelism-aware request scheduling in a shared memory implementation. The novel parallelism-aware architecture leverages the capabilities in conventional memory systems (e.g., DRAM) where memory requests to different banks can be serviced in parallel.

The controller and memory system 200 includes a controller 202 which functions as the mediator between the on-chip memory caches (e.g., processor L2 caches) and the off-chip memory. The controller 202 receives read/write requests from L2 caches. The addresses of these requests are at the granularity of the L2 cache blocks (not shown).

The main components of the controller 202 are the memory request buffer 102 and the scheduling component 110. The request buffer 102a is illustrated in two ways: first, comprising bank request buffers (denoted BANK 0, . . . , BANK B-1) for the banks 204 in the shared memory system 108, and second, as an ordered queue 102b that shows requests to all banks 204. The memory request buffer 102b buffers the requests received for each of the banks 204, and consists of separate bank request buffers 206. This may also be implemented using a single, logically partitioned buffer. Each entry in a bank request buffer 206 contains the address (row and column), the type (read or write), the timestamp, and the state of the request along with storage for the data associated with the request.

The scheduling component 110 includes a memory access scheduler 208 and one or more of the disclosed parallelism algorithms 210. Although illustrated as separate from the scheduler block 208, the algorithm(s) 210 can be included in the scheduler block 208. The scheduling component 110 is the brain of the memory controller 202. The main function of the scheduling component 110 is to select a memory request from the memory request buffer 102b to be sent to the shared memory 108.

The memory access scheduler 208 can have a two-level hierarchical organization, which is one of many different possible implementations. The first level consists of separate per-bank schedulers 212 where each bank scheduler tracks of the state of the bank and selects the highest-priority request from its bank request buffer. The second level consists of an across-bank bus scheduler 214 that selects the highest-priority request among all the requests selected by the bank schedulers 212. In certain implementations, there may only be a single scheduler comprising the functionality of both intra-bank and across-bank schedulers. When a request is scheduled by the memory access scheduler 208, request state is updated in the bank request buffer, and the request is removed from the bank request buffer when the request is served by the bank.

Each bank has a two-dimensional structure that consists of multiple rows and columns. Consecutive addresses in memory are located in consecutive columns in the same row. The size of a row can vary, but in one conventional embodiment, ranges from 1-32 Kbytes in commodity memory (e.g., DRAM).

Each bank 204 has one row-buffer and data can only be read from this buffer. The row-buffer contains at most a single row at any given time. Due to the existence of the row-buffer, modern memory (e.g., DRAM) is not truly random access (equal access time to all locations in the memory array). Instead, depending on the access pattern to a bank, a memory access can fall into one of the three categories described above: a row-hit, a row conflict, or a row closed.

In contrast to the conventional FR-FCFS scheduler, consider a scheduler that tries to service requests from the same thread in parallel. Note parallelism-aware scheduling is achieved by prioritizing threads that already have requests that are being serviced in the banks. If there are no outstanding requests from any thread with requests being serviced in the banks, the scheduler behaves the same as an FR-FCFS (or baseline) scheduler.

For the following discussion, assume that a row-conflict bank access takes C memory cycles and a scheduled request keeps the memory address bus busy for B cycles. In almost all modern memory systems, C is significantly larger than B (represented as B<<C).

The request buffer 102b shows an example state of the memory controller 202. There are four outstanding requests: R0 and R3 from Thread 0 and, R1 and R2 from Thread 1. The request R0 that arrived first in the memory system (the oldest request) is shown at the bottom of the memory request buffer 102b followed by requests R1, R2, and R3 that arrived later in sequence.

The parallelism-aware memory scheduling component 110 takes the following actions given the initial state shown in FIG. 2. (These actions also result in the timeline shown FIG. 3). Since there are no requests being serviced by any bank 204 (the banks 204 are FREE), the scheduler 208 employs the baseline mechanism (e.g., FR-FCFS) to select which request in the request buffer 102b to schedule next. Accordingly, the baseline algorithm schedules the oldest request R0 (Thread 0, Bank 0, Row 0) to Bank 0. Bank 0 becomes busy and stays busy until this in-progress access is complete.

Thus, one request (request R0) from Thread 0 is already being serviced in the banks 204. Therefore, the scheduler 208 prioritizes Thread 0 over Thread 1 to exploit the parallelism in Thread 0's requests. Therefore, when the memory bus becomes free, the scheduler 208 schedules Thread 0's other request R3 (Thread 0, Bank 1, Row 1) even though request R3 is not the oldest request (conventional schedulers that employ FR-FCFS, for example, would have scheduled request R1 (Thread 1, Bank 1, Row 0) before request R3).

Since both Bank 0 and Bank 1 are now busy, and because the two remaining outstanding requests (R1 and R2) access these two banks, requests R1 and R2 cannot be scheduled. Servicing of requests R1 and R2 occurs only when Bank 1 and Bank 0 become free again, respectively.

When Bank 0 becomes free, and since there are no ready requests in the memory request buffer 102b from Thread 0 (note Thread 0 still has a request being serviced by Bank 1, so if Thread 0 had a request in the buffer it would have been prioritized over others), the scheduler 208 again uses the baseline algorithm (e.g., FR-FCFS) priority order to select between the remaining requests. Since the bank for request R2 (Thread 1, Bank 0, Row 1) is ready, whereas the bank for request R1 is still busy, request R2 from Thread 1 is scheduled.

When Bank 1 becomes free, the scheduler 208 schedules the remaining request R1 (Thread 1, Bank 1, Row 0). Note since Thread 1 already has a request being serviced, Thread 1 is prioritized by the scheduler 208 at this point, but this does not affect any decision, since request R1 is the only remaining request in the memory request buffer 102b.

Figure 3:
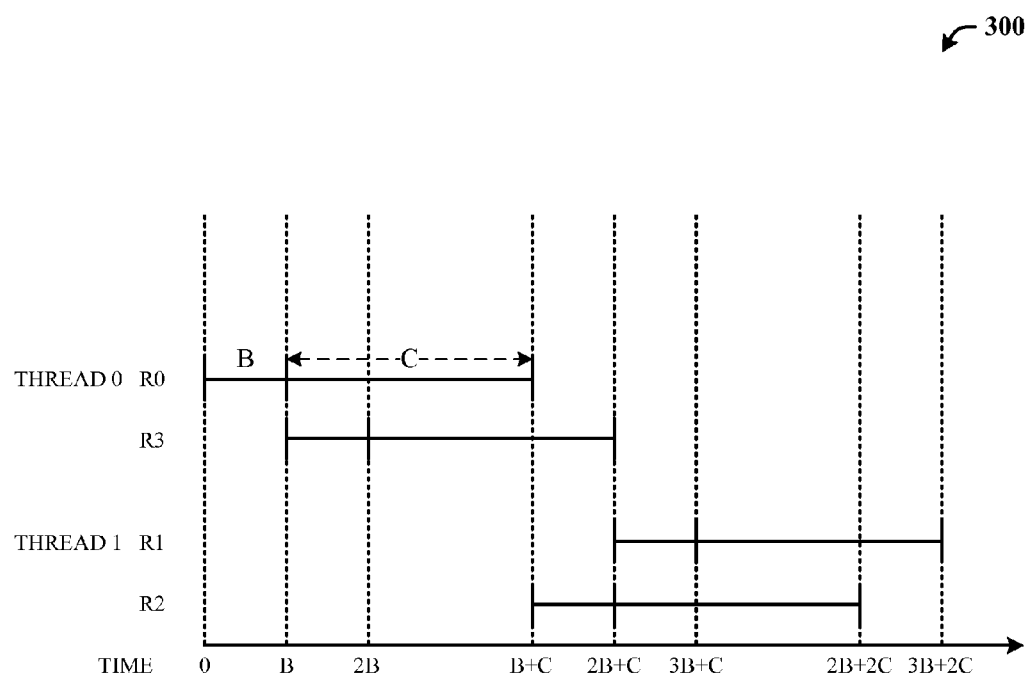
FIG. 3 illustrates a timeline of the requests in FIG. 2 using the disclosed parallelism-aware memory scheduling architecture.

FIG. 3 illustrates a timeline 300 of the requests in FIG. 2 using the disclosed parallelism-aware memory scheduling architecture. Since there are no requests being serviced by any bank at Cycle 0, the scheduler use the baseline algorithm to schedule the oldest request R0 to Bank 0. Bank 0 becomes busy and stays busy until this access is complete at cycle B+C). Since Thread 0 already has request R0 being serviced in the banks, the scheduler invokes a parallelism algorithm, which prioritizes Thread 0 over Thread 1 to exploit the parallelism in Thread 0's requests. Therefore, at Cycle B (when the memory address bus becomes free), the scheduler schedules the second request R3 of Thread 0 even though request R3 is not the oldest request (e.g., FR-FCFS schedulers would have scheduled request R1 of Thread 1 instead, thereby increasing the stall time of Thread 0).

Since both Bank 0 and Bank 1 are now busy and the two remaining outstanding requests (R1 and R2) access these two banks, the outstanding requests R1 and R2 will not be scheduled until Bank 0 and Bank 1 become free again. At the end of cycle B+C, Bank 0 becomes free, and since there are no ready requests in the memory request buffer from Thread 0, the scheduler again uses the FR-FCFS priority order to select between the remaining requests. Since the bank for request R2 is ready, whereas the bank for request R1 is still busy, request R2 from Thread 1 is scheduled. B cycles later, at the end of cycle 2B+C, Bank 1 becomes free. The scheduler schedules the remaining request R1.

According to the timeline 300 using the proposed parallelism-aware scheduler, processing takes the following number of cycles to service the requests from the two threads:

Thread 0: $2B+C$ cycles$\approx C$ cycles

Thread 1: $3B+2C$ cycles$\approx 2C$ cycles

The baseline algorithm FR-FCFS schedules requests in the order R0, R1, R2, R3. Therefore, processing takes the following number of cycles to service the requests from the two threads:

Thread 0: $3B+2C$ cycles$\approx 2C$ cycles

Thread 1: $2B+2C$ cycles$\approx 2C$ cycles

Note that, at any given time requests from different threads are serviced in parallel using the baseline conventional FR-FCFS scheduler; however, two requests from the same thread are not serviced in parallel even though the requests could be (because requests from the same thread access different banks).

As B<<C in modern memory systems (because bank access latency dominates the memory address bus latency), the following table shows the approximate performance comparison of the baseline FR-FCFS scheduler and the parallelism-aware scheduler:

|  | FR-FCFS Execution Time | Parallelism-aware Execution Time | Speedup with Parallelism-Aware Scheduler |
| --- | --- | --- | --- |
| Thread 0 | 2C | C | 2X |
| Thread 1 | 2C | 2C | 1X |

Hence, making the memory scheduler parallelism-aware improves performance (memory-related stall-time) by 2× for Thread 0 without significantly degrading the performance of Thread 1. Therefore the parallelism-aware scheduler improves the overall performance of the system.

Following is a description of an exemplary algorithm for prioritizing requests of the last-scheduled thread that is currently being serviced in memory banks. The technique in this first scheduling algorithm is to track the thread that generated the last scheduled request (if the request is still being serviced by the memory), and schedule another access from the same thread if there is an outstanding ready request from the same thread.

The benefit is that by prioritizing the requests of a thread that already has an in-progress request in the memory banks, the parallelism among the requests of that thread can be increased and the bank access latencies of these different accesses from the same thread overlap. By overlapping the access latencies of different requests from the same thread, the scheduler reduces the stall-time experienced by that thread because the thread will stall once for all of the overlapped requests, rather than stalling once for each request had the requests been serviced serially (rather than in an overlapped fashion).

In order to implement this first algorithm in the memory controller, memory request scheduler should track the thread that generated the last request that was scheduled by the scheduler and if that request is still being serviced by a memory bank. The tracking technique is described below.

The description will include flow charts that exemplify novel methods in accordance with the disclosed parallelism-aware architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 4:
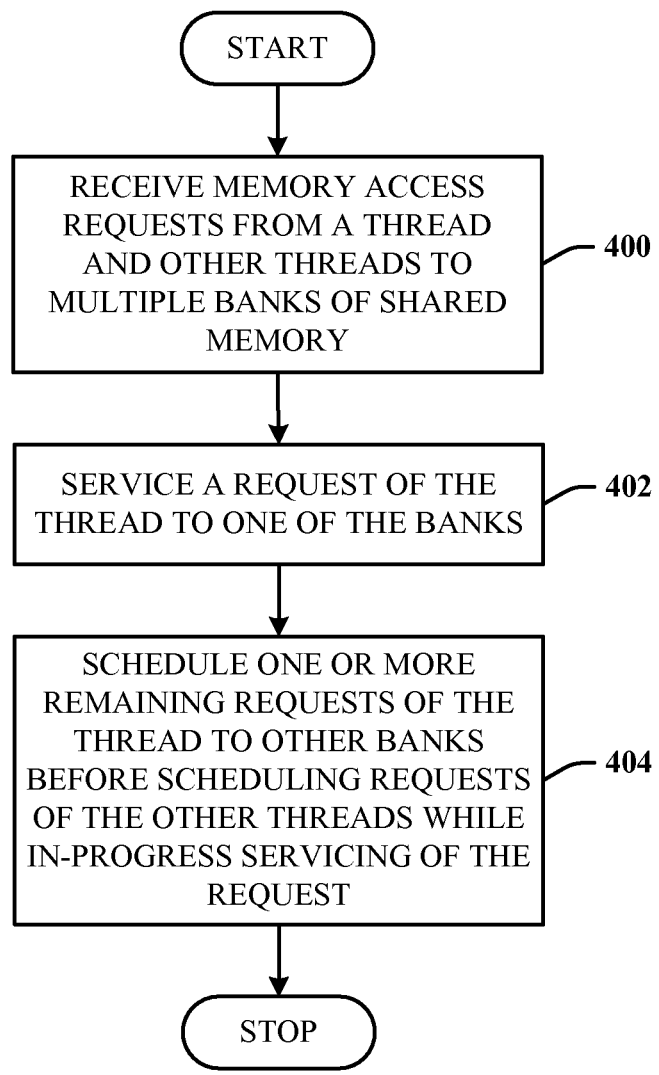
FIG. 4 illustrates a method of managing memory in a parallelism-aware architecture.

FIG. 4 illustrates a method of managing memory in a parallelism-aware architecture. At 400, memory access requests are received from a thread and other threads to multiple banks of shared memory. At 402, a request of the thread is serviced to one of the banks. At 404, one or more remaining requests of the thread are scheduled to other banks before scheduling requests of the other threads while in-progress servicing of the request.

Figure 5:
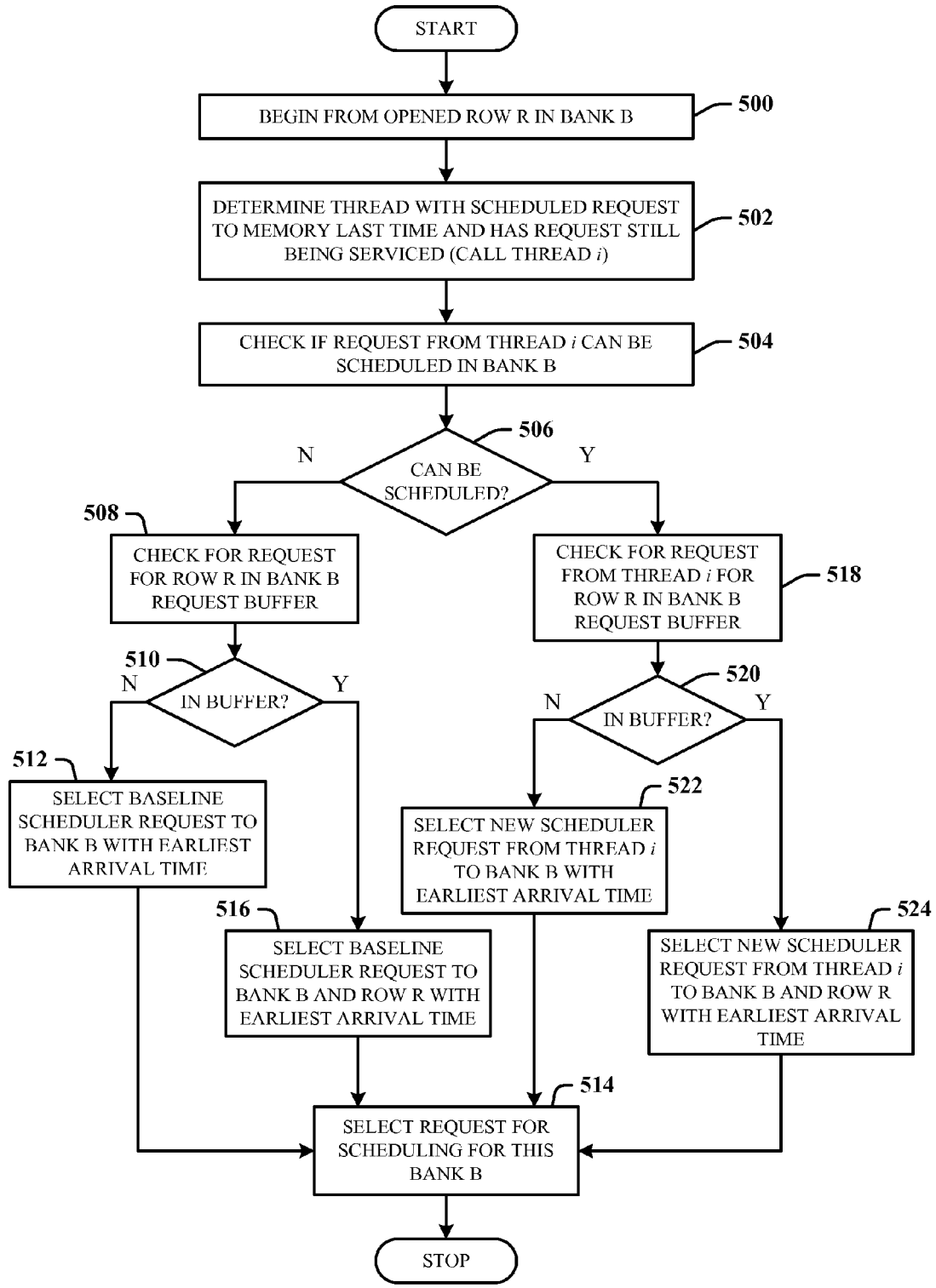
FIG. 5 illustrates a more detailed method that exemplifies an algorithm for parallelism-aware scheduling by prioritizing requests of the last-scheduled thread that is currently being serviced in memory banks.

FIG. 5 illustrates a more detailed method that exemplifies an algorithm for parallelism-aware scheduling by prioritizing requests of the last-scheduled thread that is currently being serviced in memory banks. The basic concept is to identify if the last scheduled thread (Thread i) still has a request being serviced. If this is not the case, then the scheduling algorithm uses the baseline FR-FCFS scheduling scheme.

At 500, the description begins with an opened Row R in a Bank B. At 502, the algorithm determines which thread had a request scheduled to memory (by the across-bank scheduler) the last time, and still has a request being serviced (call Thread i). At 504, a check is made if a request from Thread i can be scheduled in Bank B. If the request cannot be scheduled, flow is from 506 to 508 to check if there is a request for Row R in the Bank B request buffer. If not, at 510, flow is to 512 to select the baseline scheduler (e.g., FR-FCFS) request to Bank B with the earliest arrival time. At 514, this request is then selected for scheduling for Bank B. Alternatively, if there is a request for Row R in the Bank B bank request buffer, flow is from 510 to 516 select the baseline scheduler request to Row R and Bank B with earliest arrival time. At 514, this request is then selected for scheduling for Bank B.

If, at 506, a request from Thread i can be scheduled in Bank B, flow is to 518 to check for a request by Thread i for Row R in the Bank B request buffer. If not in the buffer, flow is from 520 to 522 to select the new scheduler request from Thread to Bank B with the earliest arrival time. Flow is then to 514 where this request is then selected for scheduling for Bank B. If in the Bank B request buffer, flow is from 520 to 524 to select the new scheduler request from Thread i to Bank B and Row R with the earliest arrival time. Flow is then to 514 where this request is then selected for scheduling for Bank B.

Put in a different terms, if the last-scheduled thread (Thread i) has a request being serviced, then there are two cases:

1. There is at least one outstanding (or ready) but not-yet-scheduled memory request from the same thread (Thread i) in the memory request buffers. In this case, the new scheduling algorithm selects requests only from Thread i. The request to be scheduled from Thread i is determined by applying the baseline FR-FCFS scheduling rules only to requests from Thread i.

2. There is no outstanding (or ready) memory request from the same thread. In this case, the new scheduling algorithm uses the baseline FR-FCFS scheduling scheme for all requests.

More formally, the novel scheduling algorithm prioritizes the requests in the bank request buffer of a bank as follows:

1. Highest priority is given to requests that are from the same thread which was most-recently scheduled, and which thread still has the last-scheduled request being serviced in the banks (a "last-thread-first" scenario). Among these requests, if any, priority is given:
   a. First, to the requests that are to the row that is currently open in this bank (a "row-hit-first" scenario), and
   b. Second, to the requests that arrived earlier in the bank request buffer (an "oldest-first" scenario).

2. Second highest priority is given to the requests that are to the row that is currently open in this bank (a "row-hit-first" scenario).

3. Third highest priority is given to the requests that arrived earlier in the bank request buffer (an "oldest-first" scenario).

Figure 6:
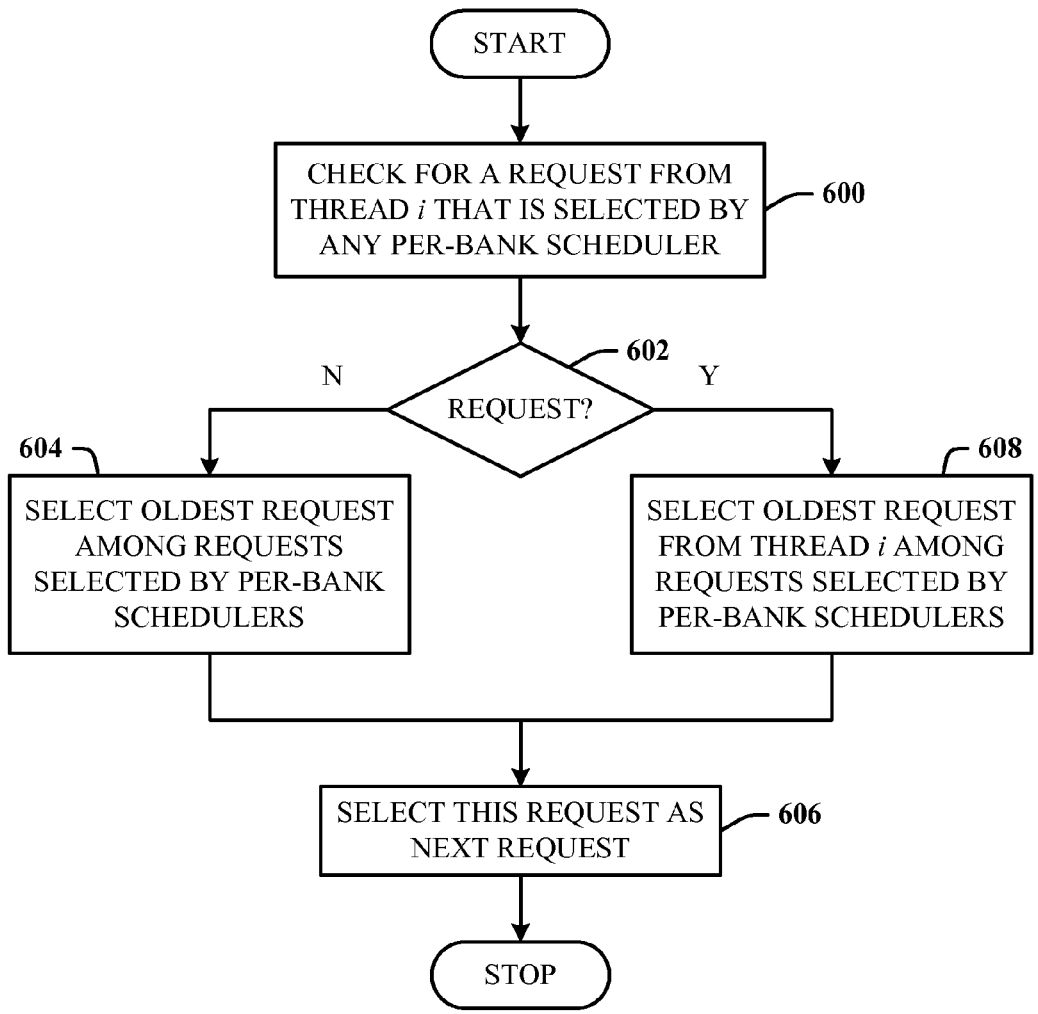
FIG. 6 illustrates a method of selecting a next request from across banks using an across-bank scheduler.

FIG. 6 illustrates a method of selecting a next request from across banks using an across-bank scheduler. At 600, the algorithm checks for a request from Thread i that has been selected by any per-bank scheduler. If there is no request, flow is from 602 to 604 to select the oldest request among requests selected by the per-bank schedulers. At 606, this request is then selected as the next request. Alternatively, if there is a request, flow is from 602 to 608 to select the oldest request from Thread i among the requests selected by the per-bank schedulers. At 606, this request is then selected as the next request.

Figure 7:
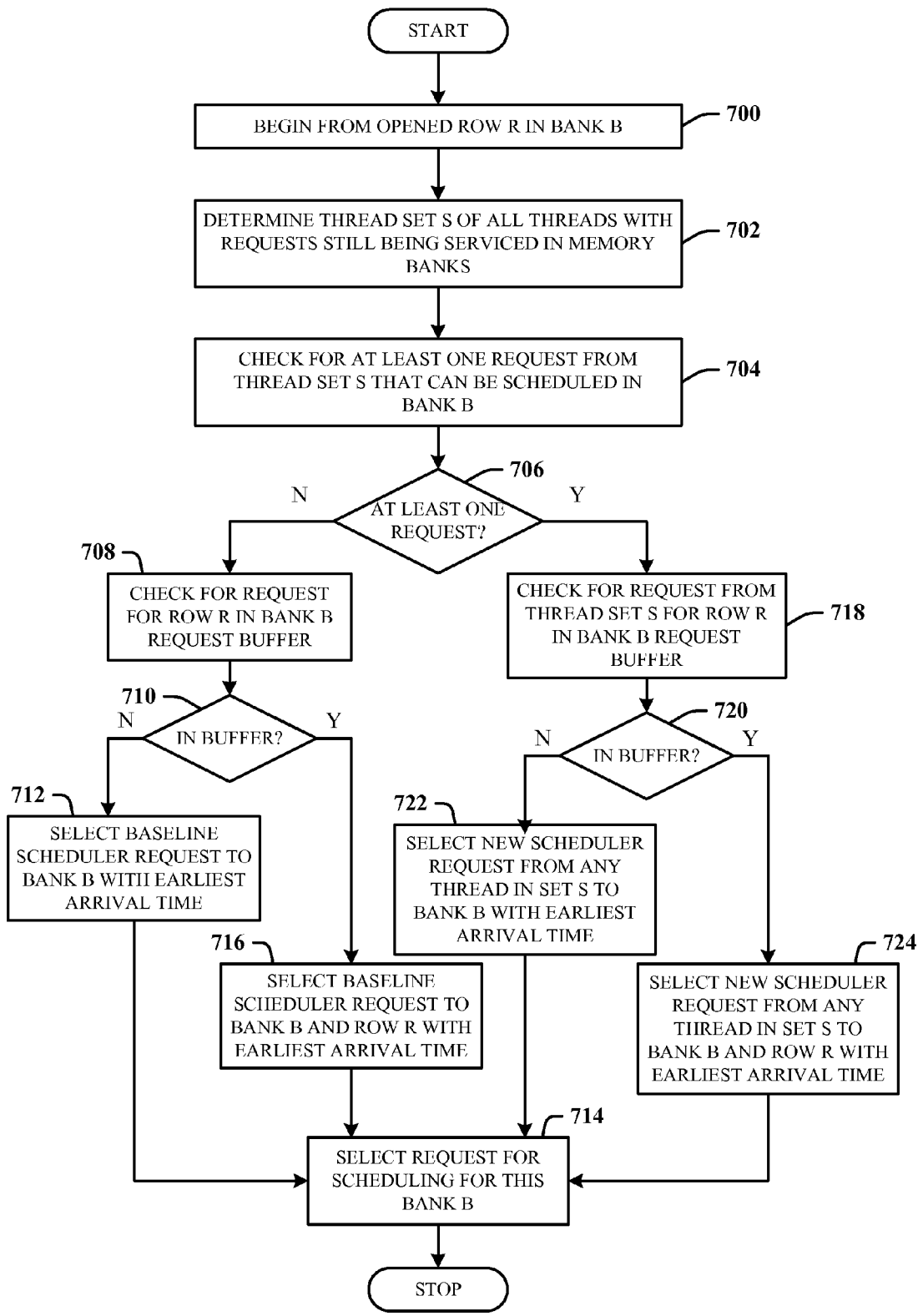
FIG. 7 illustrates a more detailed alternative method that exemplifies an algorithm for parallelism-aware scheduling by prioritizing requests of all threads that are currently being serviced in memory banks.

FIG. 7 illustrates a more detailed alternative method that exemplifies an algorithm for parallelism-aware scheduling by prioritizing requests of all threads that are currently being serviced in memory banks. The idea of this scheduling algorithm is to keep track of the threads that have at least one request currently being serviced in the memory banks (this set of threads is referred to as active-threads and denoted as Set S). In other words, at least one request of an active-thread is currently being serviced in a bank (e.g., DRAM). The highest priority is then given to these active threads in the scheduling decisions. In other words, requests from another set of threads are scheduled only if no ready requests exist from active-threads in the memory request buffer.

By prioritizing the requests of the threads that already have an in-progress request in the banks, parallelism among the requests of those threads can be increased and the bank access latencies of the different accesses from the same thread can be overlapped. By overlapping the access latencies of different requests from the same thread, the scheduler reduces the stall time experienced by that thread because the thread will stall once for all of the overlapped requests, rather than stalling once for each request had the requests been serviced serially (instead in an overlapped fashion).

At 700, the description begins with an opened Row R in a Bank B. At 702, the algorithm determines a Thread Set S of all active threads (threads that have requests that are still being serviced). At 704, a check is made for at least one request from an active thread in Set S that can be scheduled in Bank B. If there is no request from Thread Set S that can be scheduled, flow is from 706 to 708 to check for a request for Row R of the Bank B request buffer. If no such request is in the buffer, at 710, flow is to 712 to select the baseline scheduler (e.g., FR-FCFS) request to Bank B with the earliest arrival time. At 714, this request is then selected for scheduling for Bank B. Alternatively, if there is a request for Row R in the Bank B bank request buffer, flow is from 710 to 716 select the baseline scheduler request to Row R and Bank B with earliest arrival time. At 714, this request is then selected for scheduling for Bank B.

If, at 706, there is at least one request from an active thread that can be scheduled from Thread Set S, flow is to 718 to check for a request by any of the Set S threads for Row R in the Bank B request buffer. If such a request is not in the buffer, flow is from 720 to 722 to select the new scheduler request from any thread in Set S to Bank B with the earliest arrival time. Flow is then to 714 where this request is then selected for scheduling for Bank B. If a request is in the Bank B request buffer, flow is from 720 to 724 to select the new scheduler request from a thread in Set S to Bank B and Row R with the earliest arrival time. Flow is then to 714 where this request is then selected for scheduling for Bank B.

In order to implement this algorithm in the memory controller, the memory request scheduler should know the threads that currently have at least one request being serviced in the memory banks.

Put in different terms, the basic idea is to identify all threads that currently have requests being serviced in the banks (the set of active-threads is denoted by Set S). If there are no threads in Set S, then the scheduling algorithm uses the baseline algorithm (which can be the FR-FCFS scheduling scheme). However, if there is at least one thread in Set S, then there are two cases:

1. There is at least one ready, but not-yet-scheduled, memory request from Set S in the memory request buffers. In this case, the scheduling algorithm selects requests only from Set S. The request to be scheduled from Set S is determined by applying the FR-FCFS scheduling rules only for Set S (rather than for all threads).

2. There is no ready outstanding memory request from Set S. In this case, the scheduling algorithm uses the baseline FR-FCFS scheduling scheme.

More formally, the novel scheduling algorithm prioritizes the requests in the bank request buffer of a bank as follows:

1. Highest priority is given to the requests that are from the same threads that currently have at least one request being serviced in the memory banks (an "active-threads-first" scenario). Among these requests, if any, priority is given,
   a. First, to the requests that are to the row that is currently open in this bank (a "row-hit-first" scenario), and
   b. Second, to the requests that arrived earlier in the bank request buffer (an "oldest-first" scenario).

2. Second highest priority is given to the requests that are to the row that is currently open in this bank (a "row-hit-first" scenario).

3. Third highest priority is given to the requests that arrived earlier in the bank request buffer (an "oldest-first" scenario).

Figure 8:
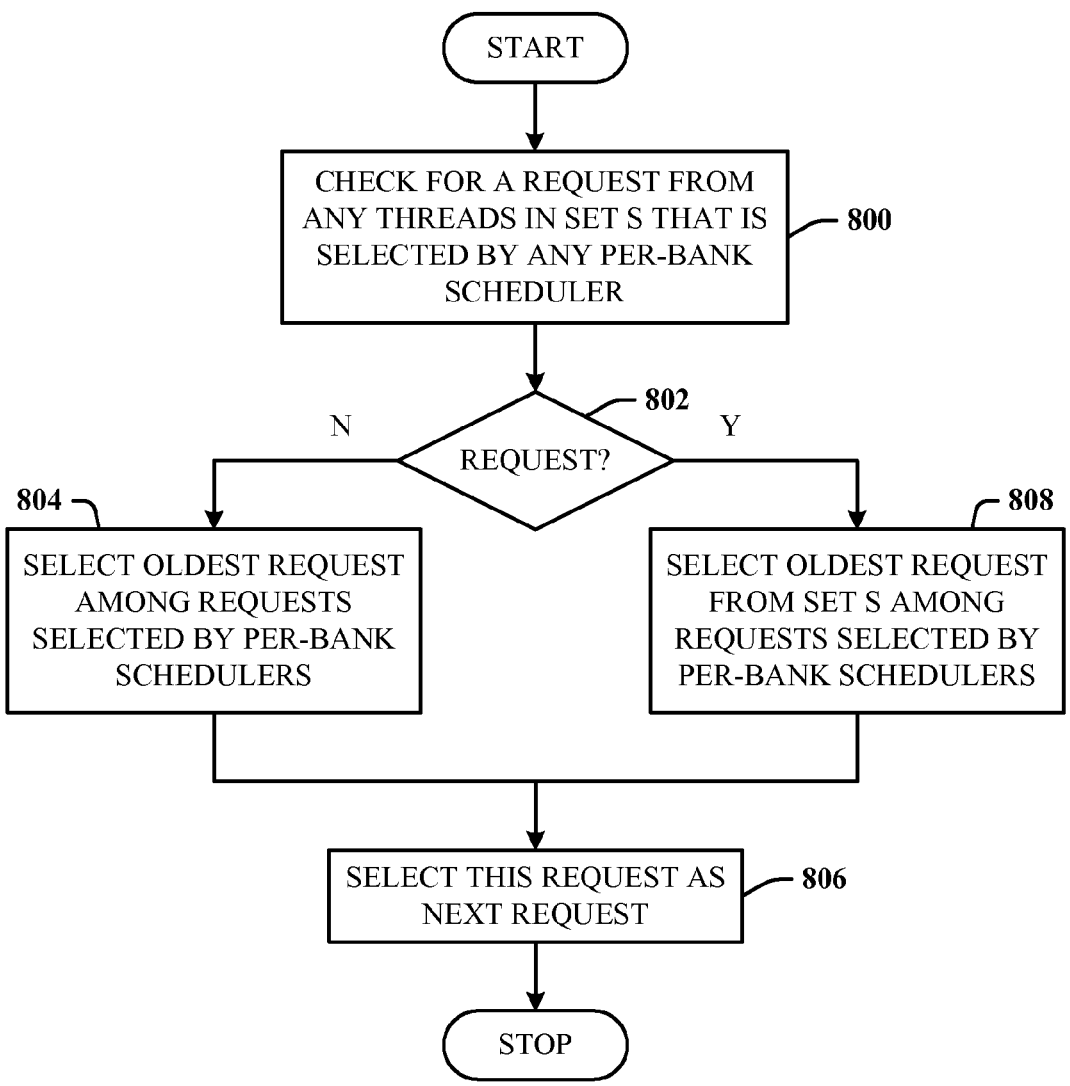
FIG. 8 illustrates a method of selecting a next request from across banks using an across-bank scheduler for this alternative algorithm.

FIG. 8 illustrates a method of selecting a next request from across banks using an across-bank scheduler for this alternative algorithm. At 800, the algorithm checks for a request from any threads in Set S that has been selected by any per-bank scheduler. If there is no request, flow is from 802 to 804 to select the oldest request among requests selected by the per-bank schedulers. At 806, this request is then selected as the next request. Alternatively, if there is a request, flow is from 802 to 808 to select the oldest request from Set S among the requests selected by the per-bank schedulers. At 806, this request is then selected as the next request.

Following is a description of exemplary hardware implementations of the algorithms. The first algorithm requires changing the implementation of both the per-bank request scheduler and the across-bank request scheduler. In particular, these two schedulers should prioritize requests from Thread i (the thread that was scheduled most recently by the across-banks scheduler provided that the scheduled request is still being serviced in the DRAM banks) over the requests from other threads. The implementation of the memory access scheduler therefore tracks Thread i.

FIG. 9 illustrates one exemplary implementation of a bank request buffer 900 for parallelism-aware scheduling in accordance with the disclosed architecture. The implementation assumes that each request in the bank request buffer 900 is tagged with a thread identifier in a field (denoted Thread-ID) indicating the ID of the thread that generated the request. Furthermore, it is assumed that each request in the whole memory request buffer is tagged with a request identifier in a field (denoted Request-ID) indicating the age of the request.

Figure 10:
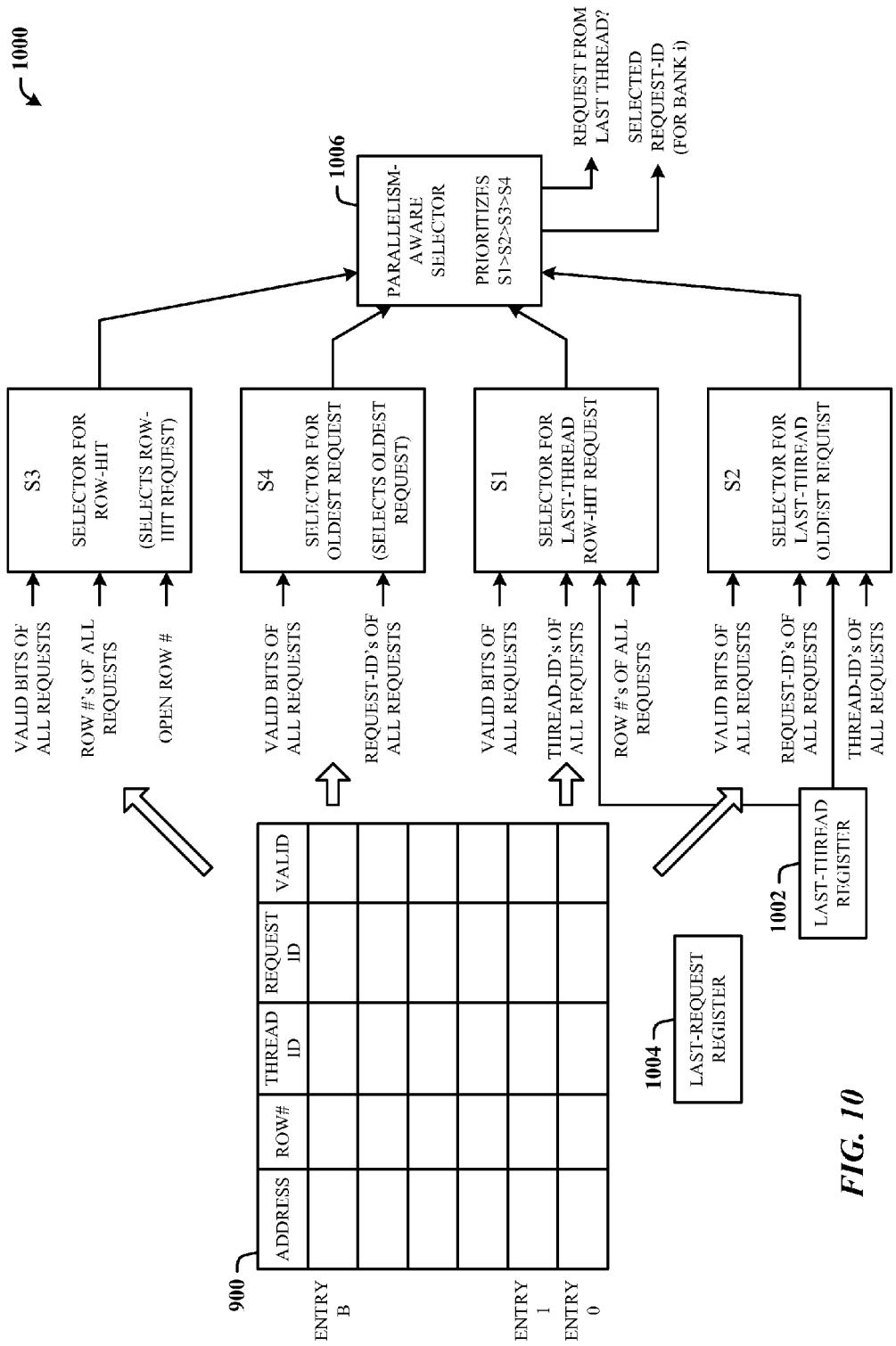
FIG. 10 illustrates an exemplary high-level implementation of a parallelism-aware within-bank scheduler for the first algorithm.

FIG. 10 illustrates an exemplary high-level implementation 1000 of a parallelism-aware within-bank scheduler for the first algorithm. Note that many different implementations are possible due to the complex nature of memory controllers. There are four different first-level selectors (denoted S1, S2, S3, and S4) that select requests using different criteria, for example: selector S1 selects the oldest row-hit request from the last thread, if any; selector S2 selects the oldest request from the last thread, if any; selector S3 selects the oldest row-hit request among all threads, if any; and selector S4 selects the oldest request from all threads, if any.

The selectors (S1, S2, S3, and S4) receive inputs from the bank scheduler 900. For example, selector S3 receives the valid bits of all requests, the row numbers of all requests, and the open row number. Selector S4 receives the valid bits of all requests and the Request-ID's of all requests. Selector S1 receives the valid bits of all requests, the Thread-ID's of all requests, and the row numbers of all requests. Selector S2 receives the valid bits of all requests, the Request-ID's of all requests, and the Thread-ID's of all requests.

In support of tracking a most-recently scheduled thread, a last-thread register 1002 is added to the memory controller that tracks Thread i. To track of the Request-ID of the last scheduled request a last-request register 1004 is added. The last-request register is only used as a 'helper-register' in order to properly maintain the last-thread register. The registers (1002 and 1004) are updated as follows:

1. At initialization time (reset), the last-thread register 1002 is set to a value that is not a valid Thread-ID.

2. When the across-bank scheduler selects a request to be scheduled, the scheduler copies the Thread-ID of the request into the last-thread-register 1002 and the Request-ID into the last-request-register 1004.

3. When a request is fully serviced by the memory bank, the request's Request-ID is compared by the memory controller with the last-request-register 1004. If values are equal, last-thread-register 1002 is reset to a value that is not a valid Thread-ID, thereby indicating that no request is currently being serviced. Otherwise, no action is taken.

Selectors S1 and S2 also receive the value in the last-thread register 1002. The selectors S1, S2, S3 and S4 output information to a second-level selector 1006 (referred to as a parallelism-aware selector). The second-level selector 1006 chooses one request from the selections made by the four first-level selectors (S1, S2, S3 and S4). The requests chosen by different first-level selectors (S1, S2, S3 and S4) are prioritized as S1>S2>S3>S4. In other words, the selected request for selector S1 is given higher priority in the second-level selector 1006 over the request of selector S2, the request of selector S2 over the request of selector S3, and the request of selector S3 over the request of selector S4. For example, if all selectors (S1, S2, S3 and S4) selected different requests, the request chosen by selector S1 is selected to be scheduled by the second-level selector 1006.

Figure 11:
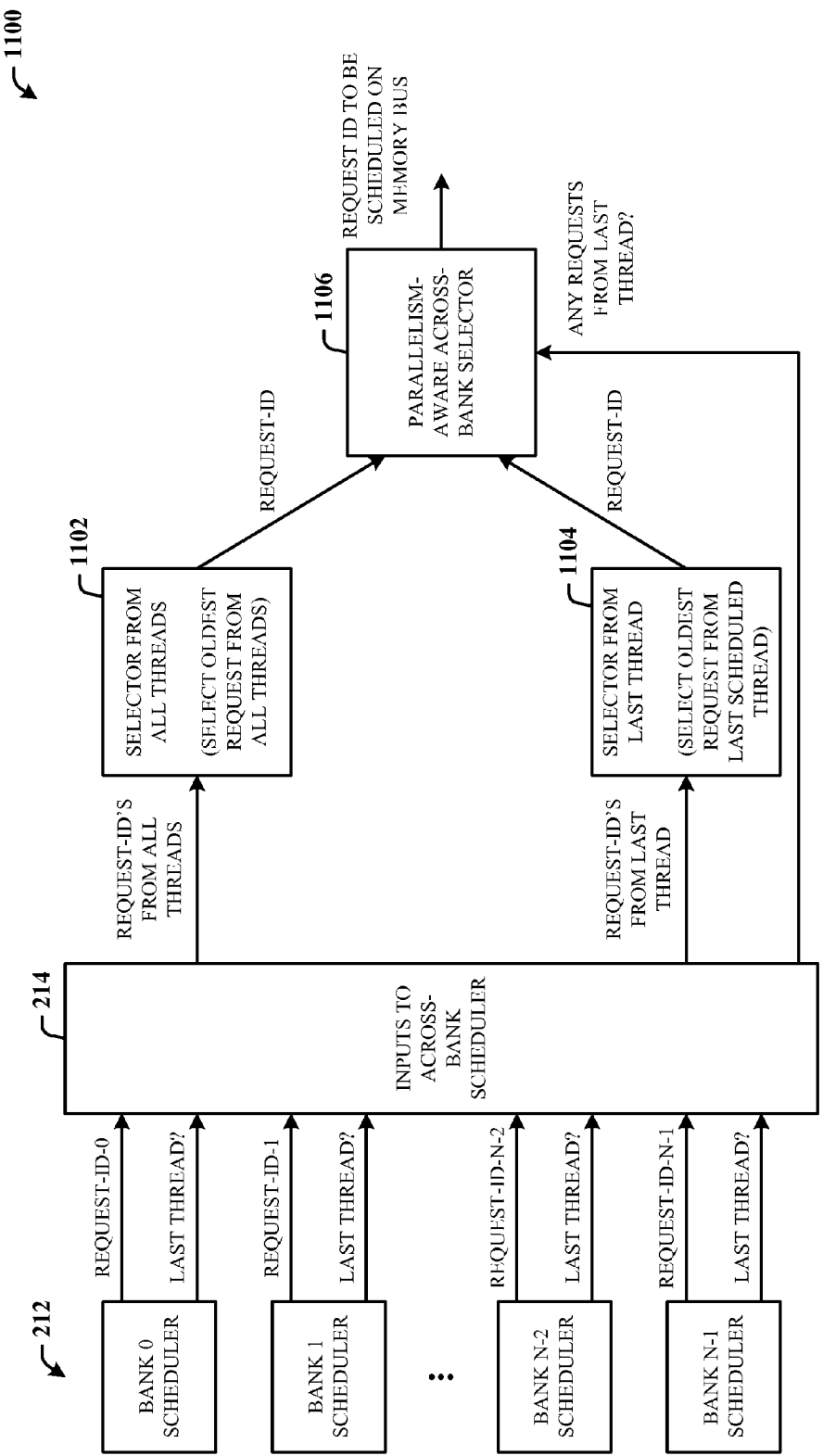
FIG. 11 illustrates an exemplary system of a parallelism-aware across-bank memory bus scheduler for the first algorithm.

There are two outputs of the second-level selector 1006: the Request-ID of the request selected by the bank scheduler, and whether or not the selected request is from the last scheduled thread. These two outputs are input into the across-bank scheduler 214 in the system 1100 of FIG. 11. FIG. 11 illustrates an exemplary system 1100 of a parallelism-aware across-bank memory bus scheduler 214 for the first algorithm. The across-bank scheduler 214 receives as input all Request-ID's selected by the individual bank schedulers 212. The across-bank scheduler 214 also receives as input the other output of each of the bank scheduler 212, that is, whether or not the input Request-ID is from the last thread.

The system 1100 also consists of two levels of selectors. There are two first-level selectors 1102 and 1104. The first selector 1102 (selector from all threads) chooses the oldest request from all threads (among the requests selected by all bank schedulers). The second selector 1104 (selector from last thread) chooses the oldest request from the last scheduled thread (among the requests selected by bank schedulers whose last thread outputs are set to true).

The second level parallelism-aware selector 1106 chooses from the outputs of the two first-level selectors (1102 and 1104). If there is at least one request from the last thread, the second-level selector 1106 chooses the output of the first-level selector 1102 from last thread. Otherwise, the second-level selector 1106 chooses the output of the first-level selector from all threads 1104. The Request-ID selected by this second-level selector 1106 is the request that will be scheduled onto the bus.

Both the within-bank scheduler 1000 of FIG. 10 and the across-bank scheduler 1100 of FIG. 11 read the last-thread-register 1002 at the beginning of the memory scheduling cycle. If the last-thread-register 1002 contains a valid Thread-ID, then the requests of that thread are prioritized by both schedulers (1000 and 1100).

This prioritization can be performed in many ways and depends on the low-level logic implementation of the within-bank and across-bank schedulers (1000 and 1100). One scheduler implementation can sort the requests in the bank schedulers periodically using the priority field associated with each request (the value of the priority field is determined using the baseline algorithm rules). Under such an implementation, prioritizing the "last-thread" is simply accomplished by increasing the priority of its requests in the scheduler. For example, if a request is from the "last-thread" (if the Thread-ID of a request is the same as the last-thread-register value), then the most significant bit of request priority field is set to one. In contrast, if the Thread-ID of a request is different from the last-thread-register value, then the most significant bit of the request priority field is set to zero. Under such an implementation, when requests are sorted based on priorities in the bank scheduler, requests from the last-thread will always have higher priority.

Following is a description for implementing the second algorithm. The second algorithm also requires changing the implementation of both the per-bank request scheduler and the across-bank request scheduler. In particular, these two schedulers should prioritize requests from thread Set S (active-threads) over the requests from other threads. Recall that thread Set S is the set of all threads that currently have requests being serviced in memory banks. The implementation of the memory access scheduler therefore should track thread Set S. Note that the implementation of the second algorithm is similar to the implementation of the first algorithm except for the determination of thread Set S.

Figure 12:
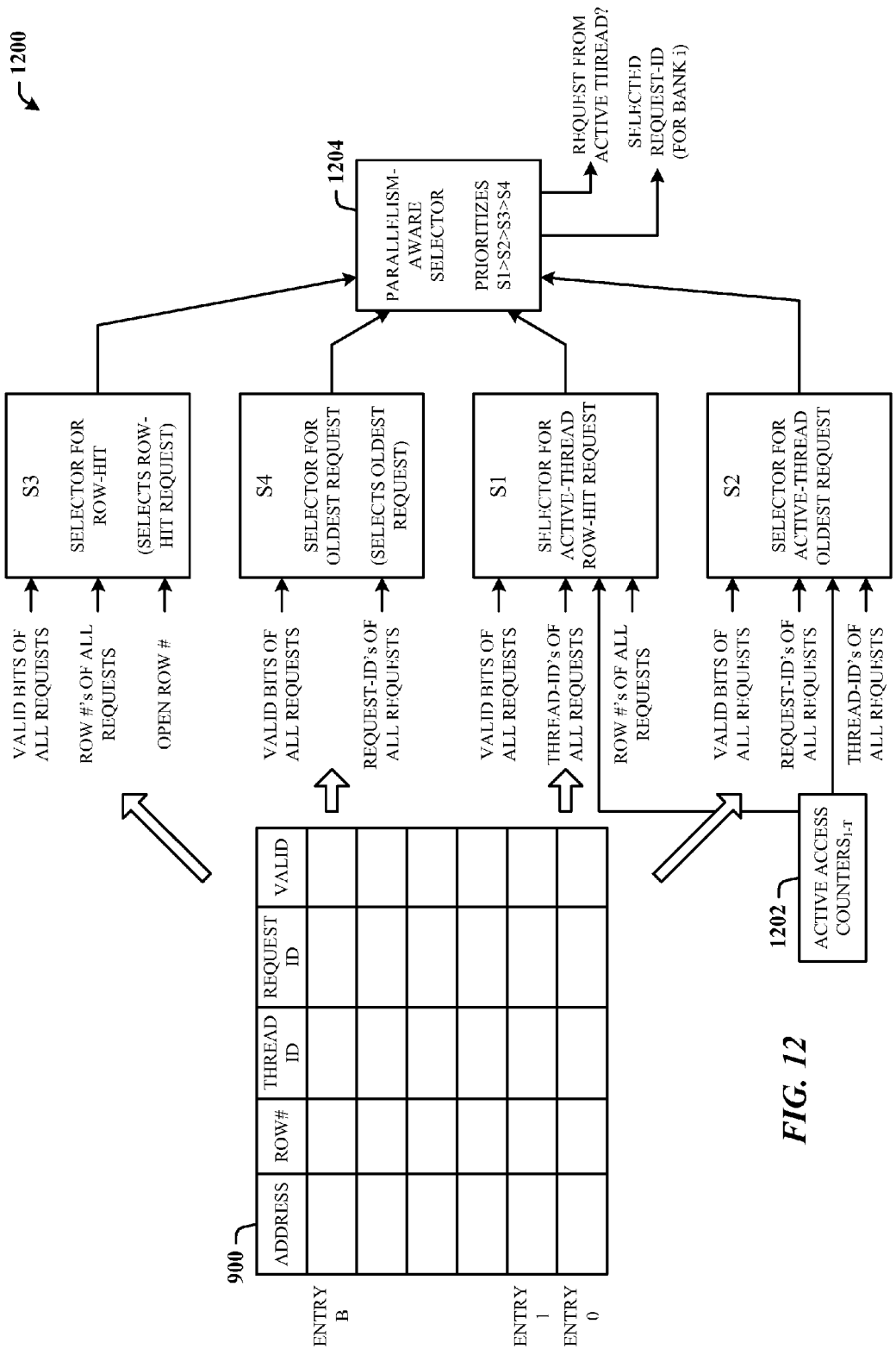
FIG. 12 illustrates an exemplary high-level implementation of a parallelism-aware within-bank scheduler for the second algorithm.

FIG. 12 illustrates an exemplary high-level implementation 1200 of a parallelism-aware within-bank scheduler for the second algorithm. Note that many different implementations are possible due to the complex nature of memory controllers. There are four different first-level selectors (denoted S1, S2, S3, and S4) that select requests using different criteria, for example: selector S1 selects the row-hit request from an active thread, if any; selector S2 selects the oldest request from an active thread, if any; selector S3 selects the oldest row-hit request among all threads, if any; and selector S4 selects the oldest request from all threads, if any.

The selectors (S1, S2, S3, and S4) receive inputs from the bank scheduler 900. For example, selector S3 receives the valid bits of all requests, the row numbers of all requests, and the open row number. Selector S4 receives the valid bits of all requests and the Request-ID's of all requests. Selector S1 receives the valid bits of all requests, the Thread-ID's of all requests, and the row numbers of all requests. Selector S2 receives the valid bits of all requests, the Request-ID's of all requests, and the Thread-ID's of all requests.

In support of tracking threads with requests being serviced by memory banks, a set of counters is added to the memory controller that keeps track of the number, for each thread, of requests that are currently being serviced in the banks. The number of counters required is equivalent to the number of threads that share the memory system. The size of each counter is determined by the number of banks. Each counter is referred to as an active-access-counter, collectively represented as active access counters$_{1-T}$ 1202 in FIG. 12. For example, active-access-counter[T] tracks the active access count for Thread T.

The active-access-counters 1202 can be updated as follows:

1. At initialization time (reset), all counters are set to zero.
2. When the across-bank scheduler selects a request to be scheduled, the scheduler increments the counter of the corresponding thread (using the Thread-ID of the request).
3. When a request is fully serviced by the memory bank, the counter of the corresponding thread is decremented (using the Thread-ID of the request).

Selectors S1 and S2 also receive the values in the active-thread registers 1202.

The selectors S1, S2, S3 and S4 output information to a second-level selector 1204 (referred to as a parallelism-aware selector). The second-level selector 1204 chooses one request from the selections made by the four first-level selectors (S1, S2, S3 and S4). The requests chosen by different first-level selectors (S1, S2, S3 and S4) are prioritized as S1>S2>S3>S4. In other words, the selected request for selector S1 is given higher priority in the second-level selector 1204 over the request of selector S2, the request of selector S2 over the request of selector S3, and the request of selector S3 over the request of selector S4. For example, if all selectors (S1, S2, S3 and S4) selected different requests, the request chosen by selector S1 is selected to be scheduled by the second-level selector 1204.

Figure 13:
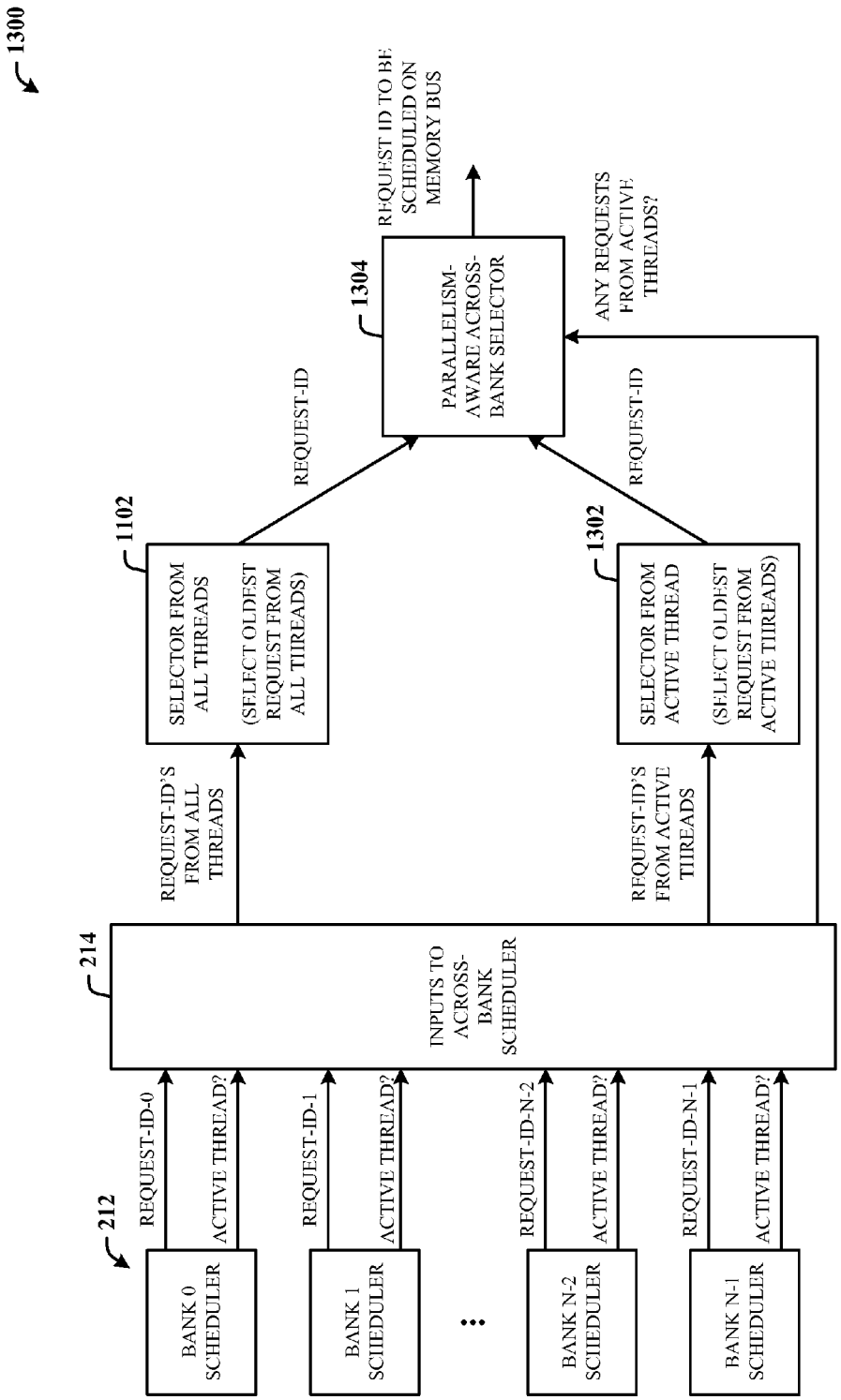
FIG. 13 illustrates an exemplary system of a parallelism-aware across-bank memory bus scheduler for the second algorithm.

There are two outputs of the second-level selector 1204: the Request-ID of the request selected by the bank scheduler, and whether or not the selected request is from the active thread. These two outputs are input into the across-bank scheduler 214 in the system 1300 of FIG. 13. FIG. 13 illustrates an exemplary system 1300 of a parallelism-aware across-bank memory bus scheduler 214 for the second algorithm. The across-bank scheduler 214 receives as input all Request-ID's selected by the individual bank schedulers 212. The across-bank scheduler 214 also receives as input the other output of each of the bank scheduler 212, that is, whether or not the input Request-ID is from the active thread.

The system 1300 also consists of two levels of selectors. There are two first-level selectors: the selector 1102 and a second 1302. The first selector 1102 (selector from all threads) chooses the oldest request from all threads (among the requests selected by all bank schedulers). The second selector 1302 (selector from active thread) chooses the oldest request from the active threads (among the requests selected by bank schedulers whose active thread outputs are set to true).

The second level parallelism-aware selector 1304 chooses from the outputs of the two first-level selectors (1102 and 1302). If there is at least one request from an active thread, the second-level selector 1304 chooses the output of the first-level selector from active thread 1302. Otherwise, the second-level selector 1304 chooses the output of the first-level selector from all threads 1102. The Request-ID selected by this second-level selector 1304 is the request that will be scheduled onto the bus.

Both the within-bank scheduler 1200 of FIG. 12 and the across-bank scheduler 1300 of FIG. 13 read the active-access-counters 1202 at the beginning of the memory scheduling cycle. If the active-access-counter of a thread is greater than zero, then the requests of that thread are prioritized by both schedulers. This prioritization can be performed in many ways and depends on the low-level logic implementation of the within-bank and across-bank schedulers. The implementation proposed above with the first algorithm can be extended to implement the second algorithm.

One implementation can sort the requests in the bank schedulers periodically using the priority field associated with each request (the value of the priority field is determined using the baseline FR-FCFS rules). Under such an implementation, prioritizing the threads with non-zero valued active-access-counters is accomplished by increasing the priority of its requests in the scheduler. For example, if a request is from a thread with a non-zero active-access-counter value, then the most significant bit of its priority field is set to one. In contrast, if the request is from a thread with a zero active-access-counter value, then the most significant bit of its priority field is set to zero. Under such an implementation, when requests are sorted based on priorities in the bank scheduler, requests from the last-thread will always have higher priority.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 14:
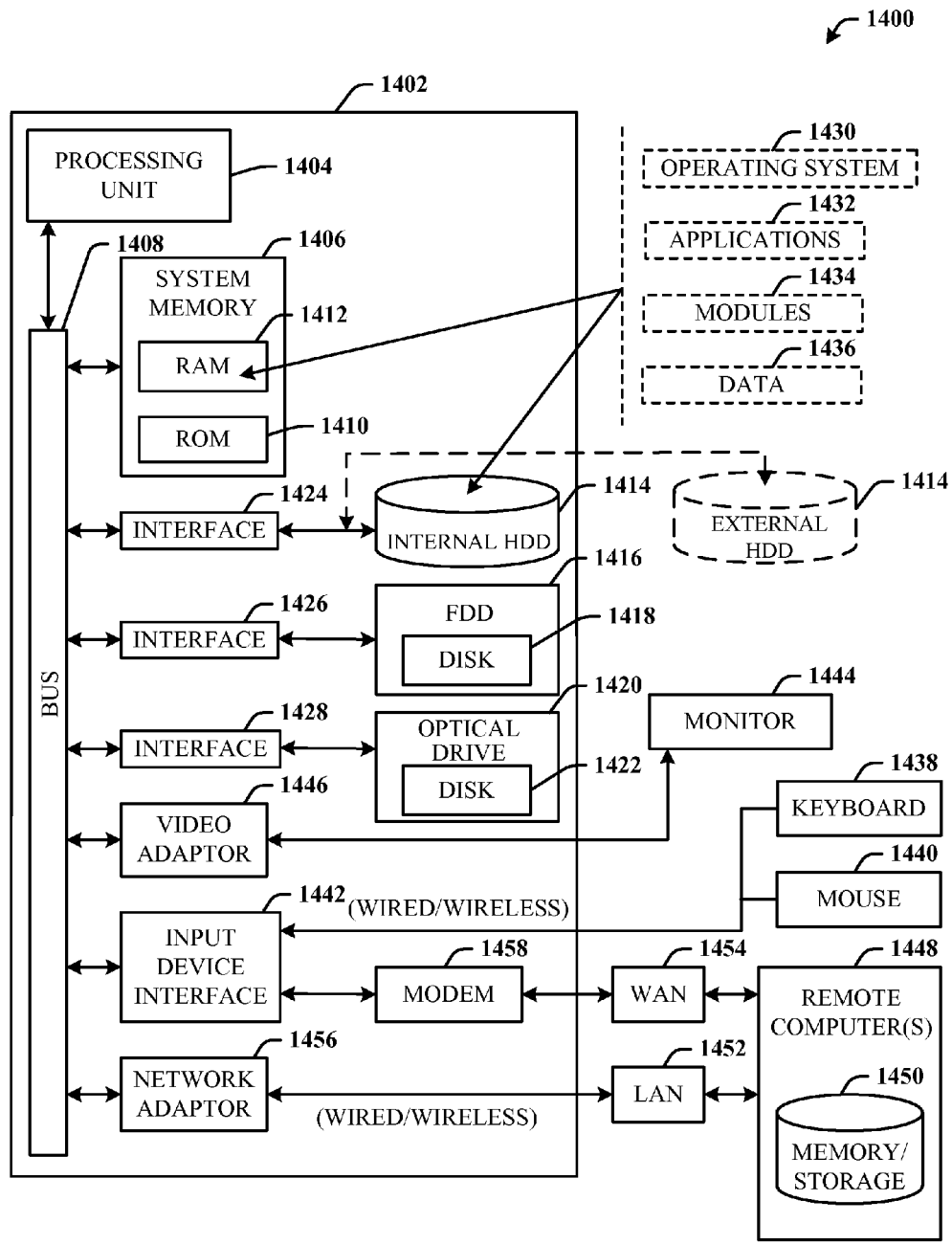
FIG. 14 illustrates a block diagram of a computing system operable to perform parallelism-aware scheduling in a shared memory system.

Referring now to FIG. 14, there is illustrated a block diagram of a computing system 1400 operable to perform parallelism-aware scheduling in a shared memory system. In order to provide additional context for various aspects thereof, FIG. 14 and the following discussion are intended to provide a brief, general description of a suitable computing system 1400 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 14, the exemplary computing system 1400 for implementing various aspects includes a computer 1402, the computer 1402 including a processing unit 1404, a system memory 1406 and a system bus 1408. The system bus 1408 provides an interface for system components including, but not limited to, the system memory 1406 to the processing unit 1404. The processing unit 1404 can be any of various commercially available processors. Dual microprocessors and other multi-processor architectures may also be employed as the processing unit 1404.

In a single-core or multi-core implementation of the processor 1404, the system memory 1406 can be a shared-memory system such that parallelism-aware scheduling can be achieved in accordance with the disclosed architecture. The threads can be initiated via the operating system 1430, applications 1432, and/or modules 1434, for example.

The system bus 1408 can be any of several types of bus structure that may further interconnect to a memory bus (with or without a memory controller), a peripheral bus, and a local bus using any of a variety of commercially available bus architectures. The system memory 1406 includes read-only memory (ROM) 1410 and random access memory (RAM) 1412. A basic input/output system (BIOS) is stored in a non-volatile memory 1410 such as ROM, EPROM, EEPROM, which BIOS contains the basic routines that help to transfer information between elements within the computer 1402, such as during start-up. The RAM 1412 can also include a high-speed RAM such as static RAM for caching data.

The computer 1402 further includes an internal hard disk drive (HDD) 1414 (e.g., EIDE, SATA), which internal hard disk drive 1414 may also be configured for external use in a suitable chassis (not shown), a magnetic floppy disk drive (FDD) 1416, (e.g., to read from or write to a removable diskette 1418) and an optical disk drive 1420, (e.g., reading a CD-ROM disk 1422 or, to read from or write to other high capacity optical media such as the DVD). The hard disk drive 1414, magnetic disk drive 1416 and optical disk drive 1420 can be connected to the system bus 1408 by a hard disk drive interface 1424, a magnetic disk drive interface 1426 and an optical drive interface 1428, respectively. The interface 1424 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 1402, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. It is to be appreciated that the disclosed architecture can be implemented with various commercially available operating systems or combinations of operating systems.

A user can enter commands and information into the computer 1402 through one or more wire/wireless input devices, for example, a keyboard 1438 and a pointing device, such as a mouse 1440. Other input devices (not shown) may include a microphone, an IR remote control, a joystick, a game pad, a stylus pen, touch screen, or the like. These and other input devices are often connected to the processing unit 1404 through an input device interface 1442 that is coupled to the system bus 1408, but can be connected by other interfaces, such as a parallel port, an IEEE 1394 serial port, a game port, a USB port, an IR interface, etc.

A monitor 1444 or other type of display device is also connected to the system bus 1408 via an interface, such as a video adapter 1446. In addition to the monitor 1444, a computer typically includes other peripheral output devices (not shown), such as speakers, printers, etc.

The computer 1402 may operate in a networked environment using logical connections via wire and/or wireless communications to one or more remote computers, such as a remote computer(s) 1448. The remote computer(s) 1448 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1450 is illustrated. The logical connections depicted include wire/wireless connectivity to a local area network (LAN) 1452 and/or larger networks, for example, a wide area network (WAN) 1454. Such LAN and WAN networking environments are commonplace in offices and companies, and facilitate enterprise-wide computer networks, such as intranets, all of which may connect to a global communications network, for example, the Internet.

When used in a LAN networking environment, the computer 1402 is connected to the local network 1452 through a wire and/or wireless communication network interface or adapter 1456. The adaptor 1456 may facilitate wire or wireless communication to the LAN 1452, which may also include a wireless access point disposed thereon for communicating with the wireless adaptor 1456.

When used in a WAN networking environment, the computer 1402 can include a modem 1458, or is connected to a communications server on the WAN 1454, or has other means for establishing communications over the WAN 1454, such as by way of the Internet. The modem 1458, which can be internal or external and a wire and/or wireless device, is connected to the system bus 1408 via the serial port interface 1442. In a networked environment, program modules depicted relative to the computer 1402, or portions thereof, can be stored in the remote memory/storage device 1450. It will be appreciated that the network connections shown are exemplary and other means of establishing a communications link between the computers can be used.

The computer 1402 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Figure 15:
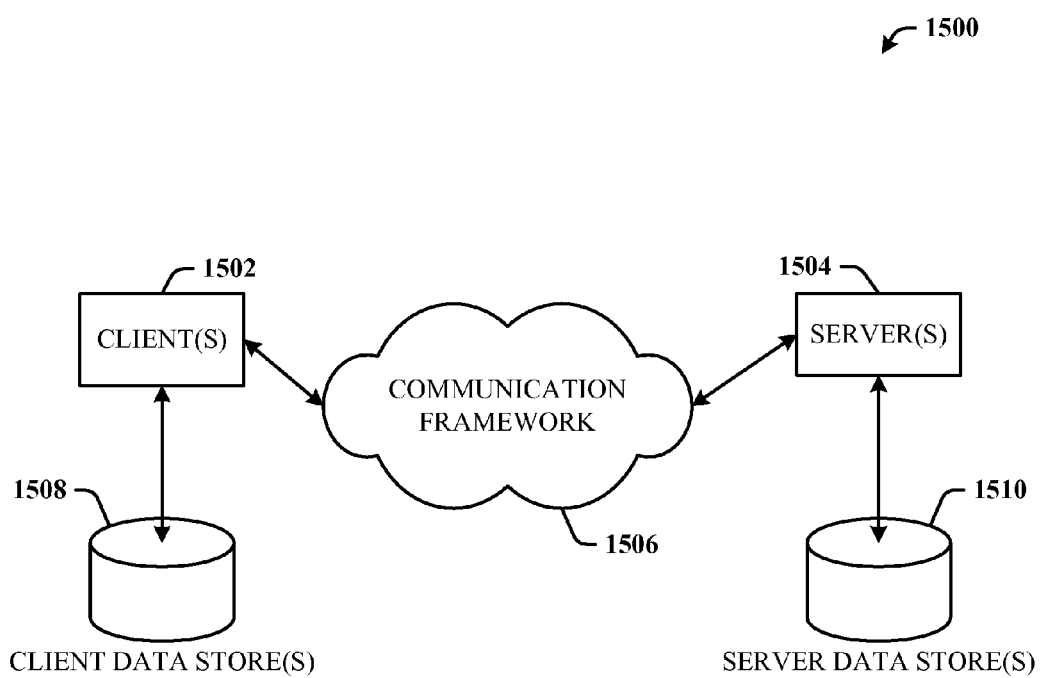
FIG. 15 illustrates a schematic block diagram of an exemplary computing environment for parallelism-aware memory request scheduling in shared memory systems.

Referring now to FIG. 15, there is illustrated a schematic block diagram of an exemplary computing environment 1500 for parallelism-aware memory request scheduling in shared memory systems. The system 1500 includes one or more client(s) 1502. The client(s) 1502 can be hardware and/or software (e.g., threads, processes, computing devices). The client(s) 1502 can house cookie(s) and/or associated contextual information, for example.

The system 1500 also includes one or more server(s) 1504. The server(s) 1504 can also be hardware and/or software (e.g., threads, processes, computing devices). The servers 1504 can house threads to perform transformations by employing the architecture, for example. One possible communication between a client 1502 and a server 1504 can be in the form of a data packet adapted to be transmitted between two or more computer processes. The data packet may include a cookie and/or associated contextual information, for example. The system 1500 includes a communication framework 1506 (e.g., a global communication network such as the Internet) that can be employed to facilitate communications between the client(s) 1502 and the server(s) 1504.

Communications can be facilitated via a wire (including optical fiber) and/or wireless technology. The client(s) 1502 are operatively connected to one or more client data store(s) 1508 that can be employed to store information local to the client(s) 1502 (e.g., cookie(s) and/or associated contextual information). Similarly, the server(s) 1504 are operatively connected to one or more server data store(s) 1510 that can be employed to store information local to the servers 1504.

The clients 1502 and servers 1504 can obtain the benefits of the disclosed parallelism-aware memory access scheduling architecture individually, and/or based on threads from each other. For example, a thread initiated by the client 1502 to the server 1504 will be processed on the server 1504 more efficiently than conventional memory controller systems. As a result, the thread on the client 1502 will complete faster thereby freeing up other threads for access scheduling more quickly.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented memory management system, comprising:
   a request buffer for receiving memory access requests to a shared memory from multiple threads; and
   a scheduling component for prioritizing scheduling of requests of a given thread of said multiple threads to increase parallel execution of the given thread requests, such that whenever a request of the given thread is in-progress, one or more remaining requests of the given thread are scheduled before scheduling requests of other threads of said multiple threads that are not in-progress, wherein a thread of said multiple threads is in-progress whenever a memory access request from that thread to the shared memory is currently being serviced.

2. The system of claim 1, wherein the given thread has a last-scheduled request and the last-scheduled request is an in-progress request.

3. The system of claim 2, wherein the scheduling component schedules another access of the given thread based on an outstanding ready request of the given thread.

4. The system of claim 2, wherein the scheduling component tracks the thread that has the last-scheduled in-progress request.

5. The system of claim 1, wherein the scheduler component includes a within-bank scheduler and an across-bank scheduler, the prioritization of given thread requests of which is based on a baseline scheduler and a parallelism-aware scheduler.

6. The system of claim 1, wherein the scheduling component includes a within-bank scheduler for generating a request identifier of a request selected by the within-bank scheduler and for generating an output showing whether the selected request is from a last-scheduled thread.

7. A computer-implemented system, comprising:
   receiving means for receiving memory access requests from a thread and other threads to multiple banks of shared memory;
   servicing means for servicing a request of the thread to one of the banks; and
   scheduling means for scheduling one or more remaining requests of the thread to other banks before scheduling requests of the other threads, based on in-progress servicing of the request, wherein the thread is in-progress whenever a memory access request from that thread to the shared memory is currently being serviced.

* * * * *